C. F. HÜTHER, Jr.
TURNING LATHE.
APPLICATION FILED MAY 1, 1911.
1,073,901.
Patented Sept. 23, 1913.
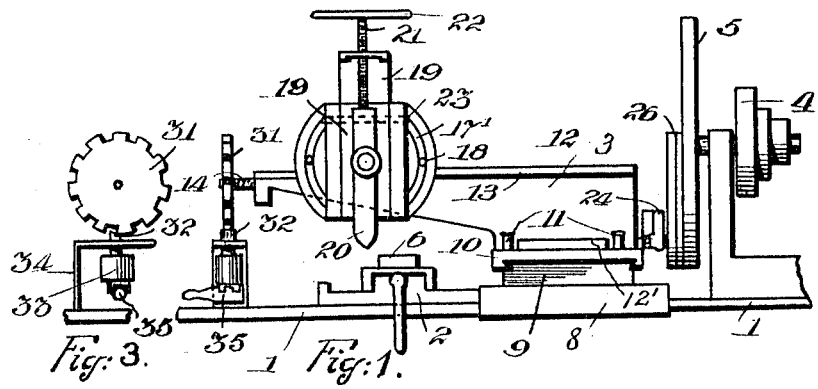
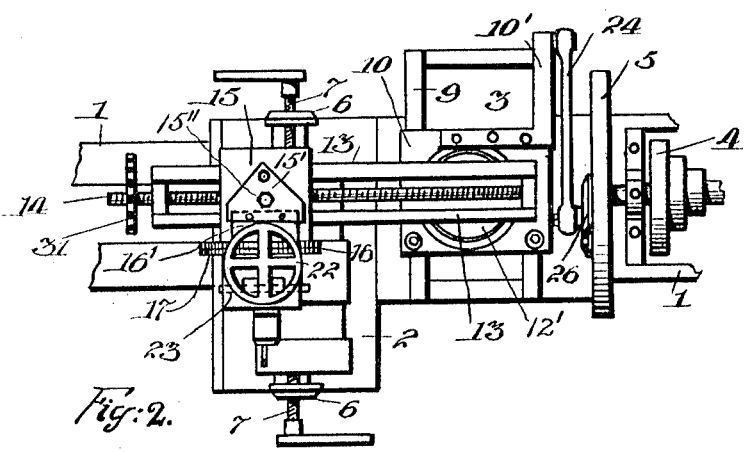
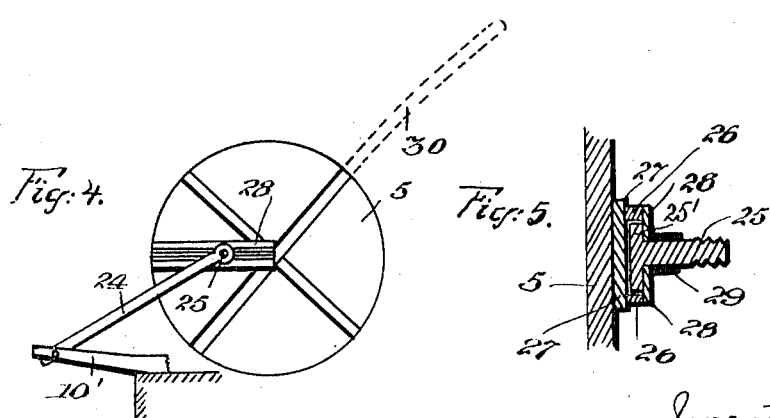
Witnesses
Inventor.
Christoph F. Hüther, Jr.
By Henry Orth, atty.

UNITED STATES PATENT OFFICE.

CHRISTOPH FRIEDRICH HÜTHER, JR., OF ESCHWEGE, GERMANY.

TURNING-LATHE.

1,073,901. Specification of Letters Patent. Patented Sept. 23, 1913.

Application filed May 1, 1911. Serial No. 624,519.

*To all whom it may concern:*

Be it known that I, CHRISTOPH FRIEDRICH HÜTHER, Jr., a citizen of the German Empire, manufacturer, residing at Eschwege, in the Kingdom of Prussia, Germany, have invented certain new and useful Improvements in Turning-Lathes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to turning lathes and has for its object to provide a machine which can be used either as a turning lathe or planing machine.

The object of the invention is secured by mounting on the transversely movable slide of the tool carriage an arm which projects longitudinally over the lathe bed, said arm being sufficiently high above the latter to permit an object, to be planed, to be placed on the work holder beneath the arm; by removing the adjusting screw of the slide and connecting said slide to the rotary chuck of the head stock by means capable of imparting to the slide a faster reciprocating movement in a direction at right angles to the lathe-bed than can be attained by the adjusting screw, and by providing means operated by said reciprocating movement for imparting to the planing tool, which is carried by said arm, a movement at right angles to the movement of the slide.

In the accompanying drawing—Figure 1, is a side elevation of a well known form of lathe bed, head stock, and tool carriage having my improved mechanism applied thereto. Fig. 2 is a plan view thereof. Fig. 3 is an elevation of the screw turning mechanism. Fig. 4 is an elevation of the rotary chuck and pitman, and Fig. 5 is a detail vertical section of the means for adjustably connecting the pitman to the chuck.

In said drawing, 1 designates the lathe bed on which are mounted the adjustable work-holder 2, the slidable tool carriage 3, and the head stock comprising the stepped pulleys 4 and the rotary chuck 5. The work-holder 2 here shown is provided at each end with a clamping jaw 6 both of which are operated by screws 7 in the usual manner.

The tool carriage 3 comprises a base having lateral flanges 8 by which it is slidably connected to and adapted to move longitudinally on the bed plate 1 and a track-way 9 on which a slide 10 is mounted, both the track way and slide being provided with interfitting flanges to form guides for the latter. Lubricating cups such as 11 are provided on the slide for keeping the tracks oiled. On the slide 10 is pivotally mounted an arm 12 which is adapted to project laterally from the slide over the work holder 2 and has a clamping plate 12' by means of which said arm may be clamped in other positions. The projecting portion of said arm tapers on its underside from the slide to its free end so as to leave sufficient space between the arm and the work holder to permit the planing tool carried by the arm to pass over the object in the holder. The top of the arm 12 is provided with the usual shears 13 which are parallel to the lathe bed. A feed screw 14 is journaled in the arm between the shears and is rotated in the manner hereinafter described to move the tool-holder along the arm. The base plate 15 of the tool holder is mounted on the shears 13 and has a nut (not shown) engaging the screw 14 so that when the latter is rotated, the tool holder is moved on the arm 12. The base plate 15 is provided with a tool rest 15' and with a clamping screw 15'' which serve to hold an ordinary turning tool. Instead of the latter a ledge 16' is inserted between the tool rest and its base plate, said ledge having a fixed perpendicular plate 16 on which is mounted a similar plate 17 which is adjustably secured to the plate 16 and clamped thereto by means of headed bolts 18 in the plate 16 projecting through arcuate slots 17' in the plate 17. This latter plate is provided with a tool holder 19 in which the planing tool 20 is vertically adjustable by a screw spindle 21 operated by a hand wheel 22. The adjustability of the clamping plates permits the positioning of the tool at any desired angle in the plane of the plates, and the tool may be pivoted in the holder on a pin 23, so as to allow the tool to yield on its back or non-cutting stroke as is usual in planing machines.

The driving connection between the slide 10 and the chuck or face plate 5 is effected by the following means: The slide has an arm 10' extending rearwardly therefrom and to said arm is connected one end of a pitman 24, the other end of which latter is connected to a pin 25 fixed to the rotary chuck 5 in any suitable manner to permit the adjustment of the pin 25 toward and from the center of the chuck.

The means here shown for forming the adjustable connection consists in providing on the face of the chuck, a channel of about the width of the head of the pin, formed by two parallel pieces 26, bolted to a plate 27 fixed on the chuck, flange pieces 28 being secured on the tops of the parallel pieces 26 to retain the head 25' of the pin 25 in the channel. A collar 29 surrounds the pin 25 forming a bearing for the pitman 24 and a nut (not shown) may be placed on the threaded end of the pin to clamp the collar against the flanges 28 and thereby clamp the head of the pin against the latter.

If it is desired to operate the machine by hand, a lever as 30 shown in dotted lines in Fig. 4, may be inserted in the chuck and in case mechanical power is used, the lever is removed and the driving belt placed on the pulleys 4.

The rotation of the feed screw 14 for advancing the tool holder is effected by a toothed wheel 31 which is fixed on the free end of said screw, and a pawl 32, is yieldingly held in the path of the teeth by a spring (not shown) inclosed in a casing 33 supported by a bracket 34 on the bed plate 1. Said pawl has a beveled end and is provided with a handle 35 by means of which it can be turned, so that either the straight or beveled side of the pawl can be presented to the wheel when the latter is moved past the pawl by the reciprocations of the arm 12. By this arrangement the rotation of the screw, and thereby the moving of the tool holder, is effected in either direction, as it will be seen that when the wheel is being carried by the arm in one direction, the straight side of the pawl will engage a tooth of the wheel and rotate the latter and screw and when the arm returns the wheel to the pawl, the beveled face of the pawl will engage the next tooth and be depressed thereby, and not cause the wheel to rotate.

It will be seen that with the above described means, a lathe of ordinary construction may be readily changed to a planer. The weight of the parts is in the central part of the lathe bed so that there is no danger of the machine being twisted or moved on its foundation by an unsymmetrical disposition of the weight.

In planing, the object is fastened on the work holder beneath the arm, a planing tool is fixed in the tool holder, the screw ordinarily used for adjusting the tool carriage transversely of the bed is removed, and the slide is connected to the chuck by the pitman as above described.

If it is desired to turn, the adjusting screw is connected with the slide, the planing tool is replaced by a turning tool and the slide disconnected from the chuck plate. The piece to be turned is fixed and driven in the ordinary manner by the chuck, or by placing it between centers and driving it by a carrier. The tail stock, which is of ordinary construction is mounted slidably on the lathe bed in a well known manner.

I claim—

1. The combination with a lathe bed, and a rotary chuck thereon, of a slide mounted over and movable transversely of the bed, a tool holder support mounted on the slide projecting above the bed and longitudinally of the bed, a stationary work holder on the bed beneath the support, a tool holder mounted on the latter, means operated by the chuck to reciprocate the slide transversely of the bed, and means operated on the reciprocations of the slide to move the tool holder longitudinally of the support.

2. The combination with a lathe bed, and a rotary chuck thereon, of a slide movable over and transversely of the bed, an arm carried by the slide projecting above the bed and longitudinally of the bed, a stationary work holder on the bed beneath said arm, a tool holder movable on the latter parallel to the bed, and a pitman connecting the chuck and slide to reciprocate the latter transversely of the bed.

3. The combination with a lathe bed, and a rotary chuck thereon, of a slide movable over and transversely of the bed, a tapering arm mounted on the slide projecting over the bed and longitudinally of the latter and having shears parallel to the bed, a stationary holder on the bed beneath the arm, a tool holder slidable on the shears, a crank pin on the chuck, and a pitman connecting the pin and slide to reciprocate the latter transversely of the bed.

4. The combination with a lathe bed, a rotary chuck thereon and a slide movable transversely of the bed, of a tapering arm mounted on the slide projecting longitudinally of the bed and having shears parallel to the latter, a work holder on the bed beneath the arm, a tool holder slidable on the shears, a crank pin on the chuck, a pitman connecting the pin and slide to reciprocate the latter transversely of the bed, and means operated on the reciprocations of the slide to move the tool holder longitudinally of the arm.

5. The combination with a lathe bed, a rotary chuck thereon and a slide movable transversely of the bed, of a tapering arm mounted on the slide projecting longitudinally of the bed and having shears parallel to the latter, a feed screw mounted between the shears, a tool holder on the latter connected with the screw, a work holder beneath the arm, a toothed wheel fixed on the screw, means connecting the chuck and slide to reciprocate the latter transversely of the bed, and means to rotate the wheel when the arm is moved in one direction.

6. The combination with a lathe bed, a rotary chuck thereon, and a slide movable transversely of the bed, of a tapering arm mounted on the slide projecting longitudinally of the bed and having shears parallel to the latter, a feed screw journaled in the arm parallel to the shears, a tool holder on the latter connected with the screw, a work holder on the bed beneath the arm, an extension on the slide, a crank-pin adjustably mounted on the chuck, a pitman connecting the extension and crank-pin, and means operated by the movement of the slide to rotate the screw.

7. The combination with a lathe bed, a rotary chuck thereon, and a slide movable transversely of the bed, of a tapering arm mounted on the slide projecting longitudinally of the bed and having shears parallel to the latter, a feed screw journaled in the arm parallel to the shears, a tool holder on the latter connected with the screw, a work holder on the bed beneath the arm, a toothed wheel fixed on the screw, an extension on the slide, a crank-pin adjustably mounted on the chuck, a pitman connecting the extension and crank-pin, means operated by the movement of the slide to rotate the screw, and a spring urged pawl having a beveled end mounted in the path of the toothed wheel.

8. The combination with a lathe bed, a rotary chuck thereon, and a slide movable transversely of the bed, of a tapering arm mounted on the slide projecting longitudinally of the bed and having shears parallel to the latter, a feed screw journaled in the arm parallel to the shears, a tool holder on the latter connected with the screw, a work holder on the bed beneath the arm, a toothed wheel fixed on the screw, an extension on the slide, a crank-pin adjustably mounted on the chuck, a pitman connecting the extension and crank-pin, means operated by the movement of the slide to rotate the screw, and a spring urged rotatable pawl having a beveled end mounted in the path of the toothed wheel.

In testimony that I claim the foregoing as my invention, I have signed my name in presence of two subscribing witnesses.

CHRISTOPH FRIEDRICH HÜTHER, Junior.

Witnesses:
GEORG F. ZEMH,
ERNST PLAUS.